Nov. 13, 1923.
J. N. MACDONALD ET AL
1,474,203
AUTOMOBILE
Original Filed Jan. 9, 1922    4 Sheets-Sheet 1
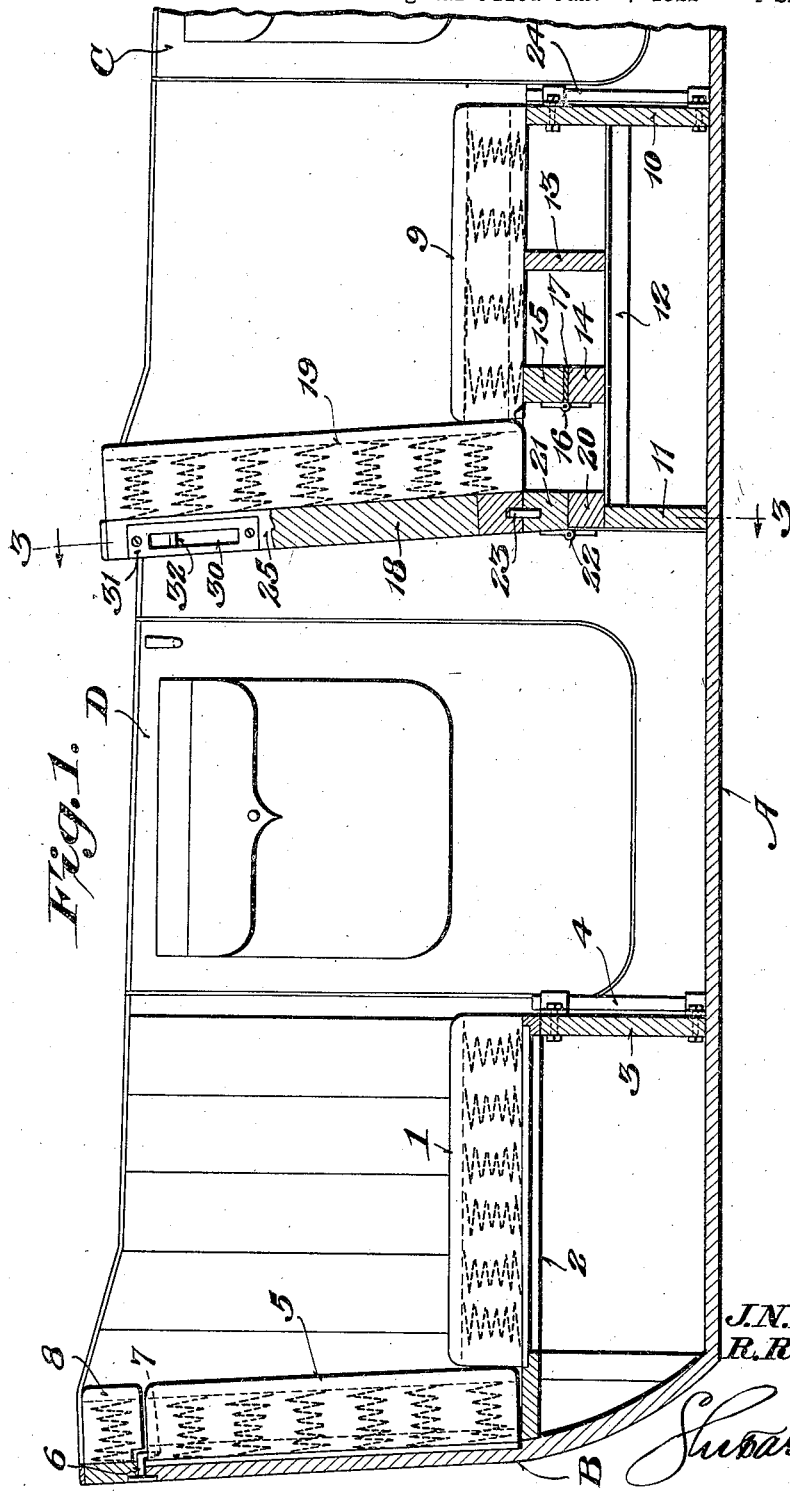
Inventors
J. N. Macdonald,
R. R. Macdonald,
Attorneys

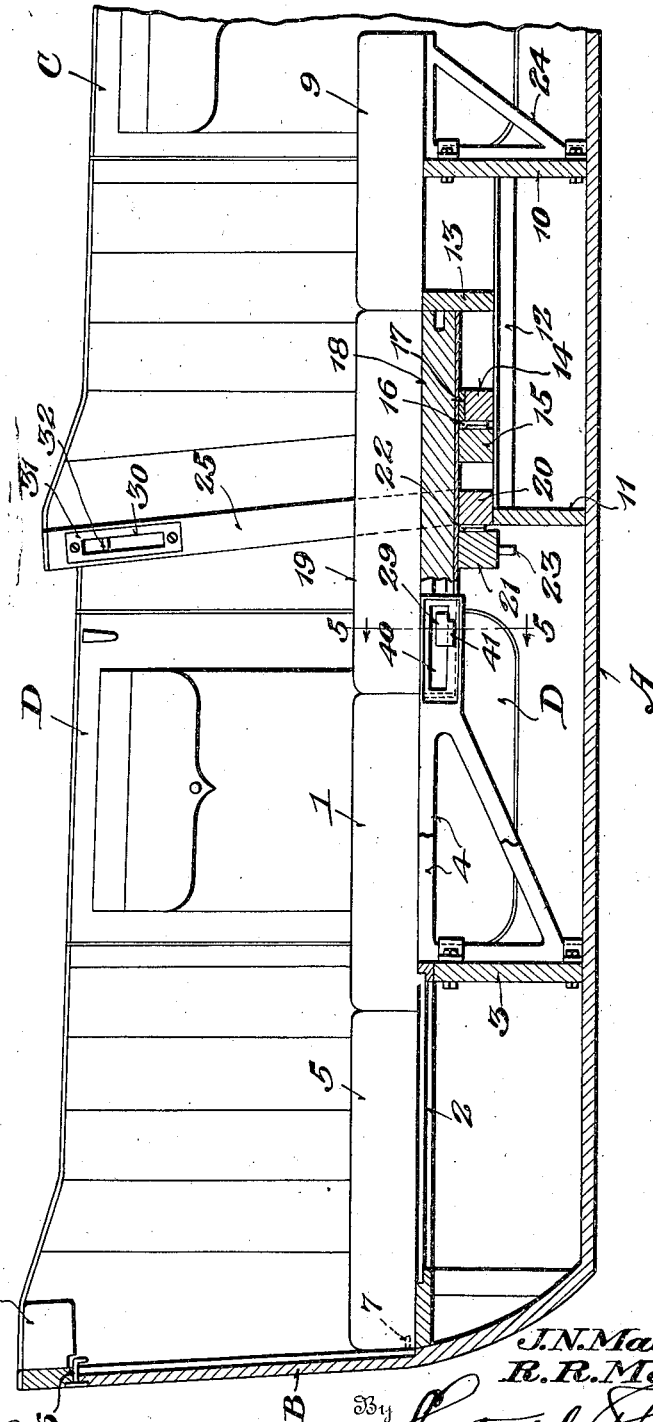

Nov. 13, 1923.
J. N. MACDONALD ET AL
1,474,203
AUTOMOBILE
Original Filed Jan. 9, 1922    4 Sheets-Sheet 3
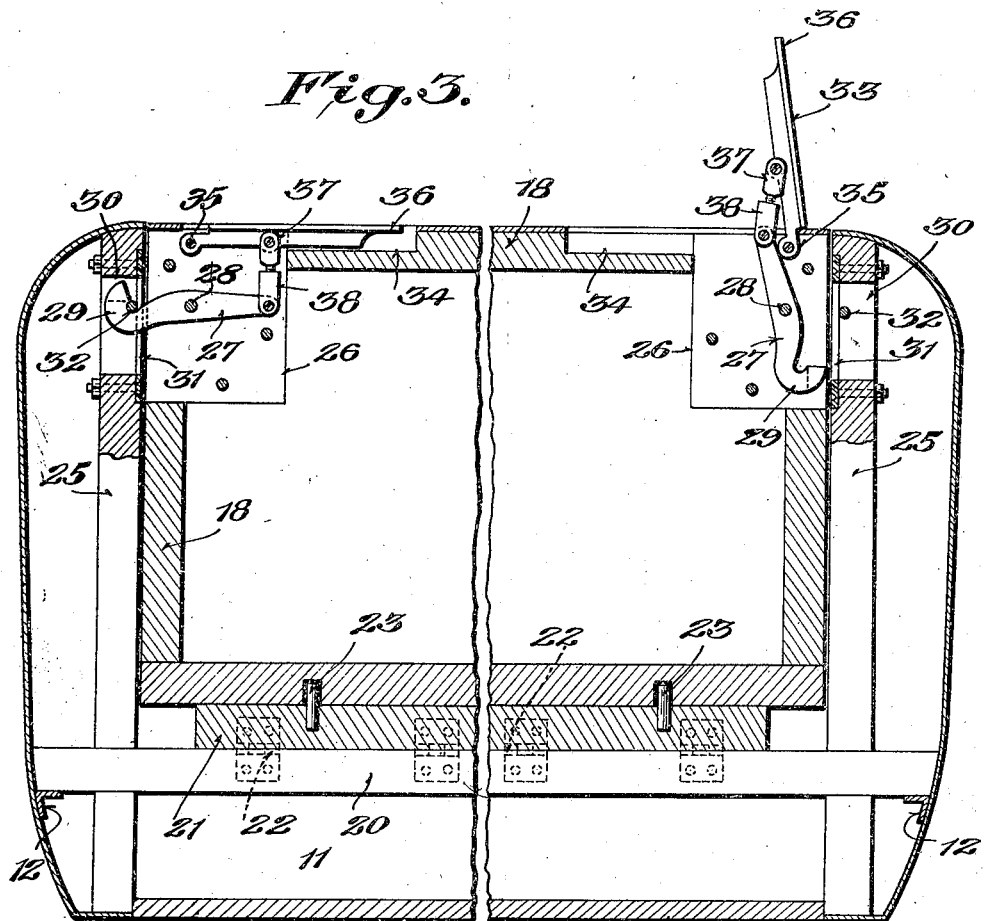
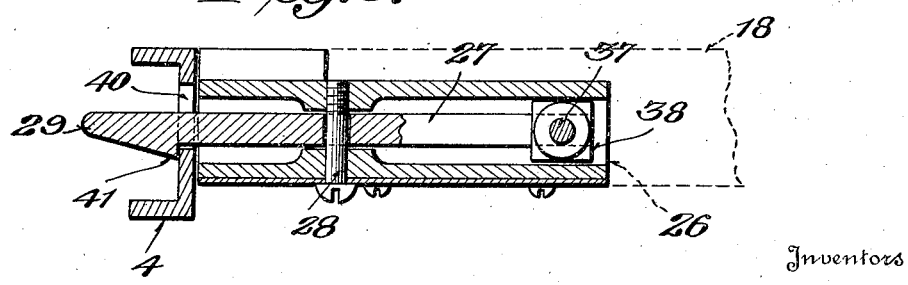

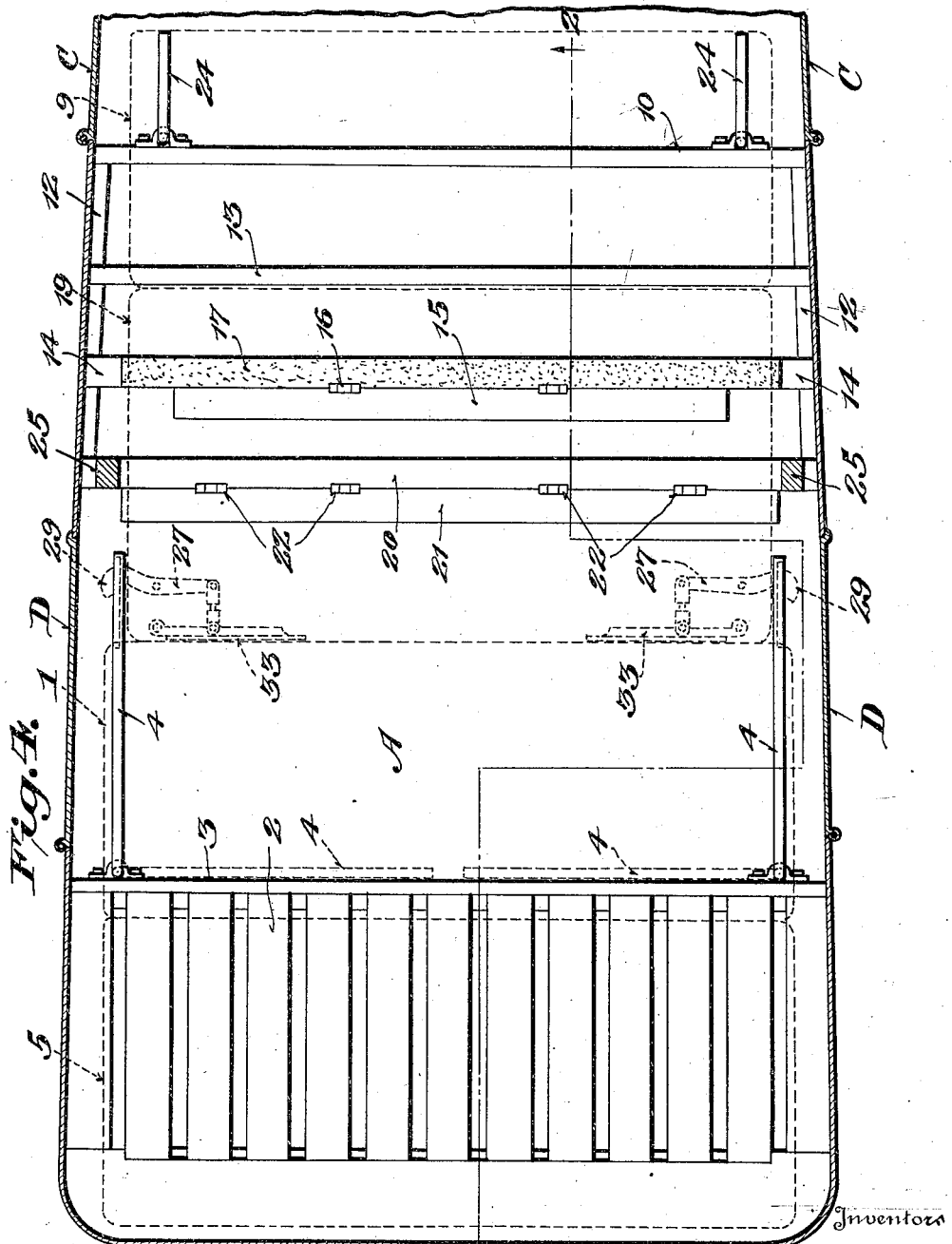

Patented Nov. 13, 1923.

1,474,203

UNITED STATES PATENT OFFICE.

JAMES NEIL MACDONALD AND ROBIN ROY MACDONALD, OF ISLAND MOUNTAIN, CALIFORNIA.

AUTOMOBILE.

Continuation of application Serial No. 527,921, filed January 9, 1922. This application filed November 1, 1922. Serial No. 598,332.

*To all whom it may concern:*

Be it known that we, JAMES NEIL MACDONALD and ROBIN ROY MACDONALD, citizens of the United States, residing at Island Mountain, in the county of Trinity and State of California, have invented new and useful Improvements in Automobiles, of which the following is a specification.

This invention relates to automobiles and has for its object to provide for conveniently shifting the seats and the seat backs so as to form a bed or couch for sleeping purposes, and is a continuation of our application Serial Number 527,921 filed January 9, 1922.

With this and other objects in view, the present invention consists in the combination and arrangement of parts as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

In the drawings,

Figure 1 is a vertical longitudinal sectional view taken through the body of a conventional automobile and showing one embodiment of the present invention, the seat and back cushions being in their normal positions to serve as seats.

Figure 2 is a view similar to Figure 1 showing the seat and back cushions disposed to form a bed or couch.

Figure 3 is a fragmentary sectional view taken on the line 3—3 of Figure 1.

Figure 4 is a plan view with the parts disposed in position to form a bed or couch, the seat and back cushions being indicated by dotted lines.

Figure 5 is a detail fragmentary sectional view on the line 5—5 of Figure 2, and on an enlarged scale.

In illustrating one embodiment of the present invention, there has been shown in the accompanying drawings, a conventional automobile body including a bottom A, a back B and front and rear doors C and D. The rear seat cushion 1 is of any conventional or approved form of construction and is supported in its normal position in any approved manner upon a suitable seat supporting frame 2 which includes a panel 3 extending transversely across the automobile body beneath and at the front of the seat 1. The rear seat 1 is removable as usual and may be pulled forward and supported upon a pair of brackets 4, each bracket being suitably hinged to the panel 3 and of a size and configuration to normally be folded back against the front of the panel and be out of the way of persons seated on the rear seat. When the brackets are swung out into position at substantially right angles to the panel 3, they form a support for the major portion of the rear seat, as best indicated in Figure 2 of the drawings. The upright back 5 of the rear seat is constructed as a spring cushion the same or substantially the same as any usual or conventional seat cushion, and is removable and capable of being substituted for the rear seat cushion 1 when the latter is moved forward and supported upon the brackets 4. The lower end of the movable back 5 of course fits down in rear of the seat cushion 1 so as to be held in place by the latter. The top of the removable back 5 is held in place by means of catches or keepers, one of which has been shown in Figures 1, 2 and 5 of the drawings, and consists in a substantially L-shaped hook or catch 6 suitably secured to the back B of the automobile body and having its outer arm portion directed downwardly so as to engage a socket or keeper 7 provided at the top of the removable back 5. Where the upholstered portion of the back for the rear seat is of an upright length exceeding the available space for the removable back portion 5 when it is removed to take the normal place of the seat cushion 1, the removable back cushion 5 is given the necessary length, and above the top of the same is provided a fixed back section 8.

For the support of the front seat cushion there is provided a supporting structure including a front panel 10 resting upon the floor A of the automobile body and extending from side to side thereof. A rear cross panel 11 is disposed a suitable distance in rear of the front cross panel. The two cross panels are connected at opposite ends by a rail 12 located substantially midway between the top and bottom of the front panel 10. The front of the seat 9 rests upon the top of the panel 10, and the intermediate portion of the seat is supported upon a cross bar 13 which in turn is supported at each end upon one of the rails 12. The rear portion of the seat 9 is supported upon a cross bar made up of a lower section 14 supported at each end upon one of the rails 12 and the upper section 15 which is connected to the lower section 14 by hinges, one of which has been shown at 16, whereby the upper section 15 may be swung rearwardly and downwardly into the position shown in Figure 2 and resting on the rails 12. The top of the lower section 14 is provided with a facing of felt or other suitable material for the purpose as will be hereinafter explained.

The upright back of the front seat includes a panel or board 18 which carries a spring cushion 19 on the front thereof. The bottom portion of the seat back extends downwardly across the rear of the front seat cushion 9 and is supported upon a cross bar made up of a lower section 20 resting on the panel 11 and an upper section 21 which is connected to the lower section 20 by hinges, one of which has been shown at 22, whereby the upper section 21 may be swung rearwardly and downwardly into the position shown in Figure 2. Normally the panel 18 of the back of the front seat is supported directly upon the cross bar section 21, which latter is provided with dowel pins, one of which has been shown at 23 in Figures 1, 2 and 3, said dowel pin being received in a seat or socket in the underside of the panel 18. It will here be explained that the panel 18 may be a solid panel or an open frame as may be desired.

Referring to Figure 2 of the drawings, it will be seen that the front seat cushion 9 may be moved forwardly and its front overhanging portion supported upon brackets, one of which has been shown at 24, in Figures 1 and 2 of the drawings, each of said brackets being suitably hinged to the front seat supporting panel 10 and capable of being folded back against the latter when not in use. After the front seat portion has been moved forwardly, the upright back of the front seat may be lifted so as to expose the cross bar sections 15 and 21, which latter are then folded over or swung rearwardly and downwardly to the position shown in Figure 2 so as to accommodate the back of the front seat when it is placed downwardly in a horizontal position upon the cross bar sections 14 and 20 and between the front end portions of the brackets 4. As the upright back of the front seat is of a greater thickness than that of the front seat cushion 9, the cross bar sections 15 and 21 have been hinged so as to be folded out of the way and thus permit the back cushion to assume a position with its top surface in the same horizontal plane with the top surface of the front seat cushion 9. When in this horizontal position, the frame or panel 18 of the back abuts against the rear side of the cross bar 13, and the rear end of the seat cushion 9 is supported upon the top of said cross bar 13. It will now be understood that the seat cushions and the upright back cushions may be conveniently brought into a horizontal position and effectually supported so as to form a sleeping bed or couch. The several cushions can obviously be returned to their normal positions in a very convenient and expeditious manner, and the interior of the body readily converted from riding condition to sleeping condition and vice versa.

The top portion of the upright back of the front seat is detachably secured at its ends to the respective sides of the automobile body, and as the fastening devices are duplicates, a description of one of them is deemed sufficient. Referring to Figure 3, it will be seen that the frame or panel 18 of the upright back of the front seat is shorter than the entire interior width of the automobile body, and said panel or frame lies between posts 25 provided within the automobile body and to which the seat back is detachably secured. In each upper corner of the panel frame 18 there is provided a socket or recess 26 to accommodate a swinging latch 27, which normally occupies a substantially horizontal position and is mounted between its ends upon a fulcrum or pivot pin 28. The bill 29 of the hooked portion of the latch normally extends upwardly and is accommodated within a recess 30 formed in the post 25, which recess is preferably equipped with a metal casing 31 having a pin or cross bar 32 around which the bill 29 of the latch is adapted to engage so as to secure the seat back to the post 25. The pivoted latch 27 is controlled by a lever 33 normally received in a horizontal position in a seat or recess 34 in the top edge of the seat back. One end of the lever 33 is pivoted or fulcrumed as at 35, and its opposite free end is provided with an over-hanging portion 36 terminating short of the adjacent end of the recess 34, whereby access may be had to the free end of the lever for pulling the same upwardly from its normal horizontal position flush with the top edge of the seat back. A link connection is provided between the lever 33 and one end of the latch 27, said link connection including link members 37 and 38, one of which is pivoted to an intermediate portion of the lever 33, and the other pivotally connected to the free end of the latch 27. An adjustable connection is provided between the link members, as for instance by having one of said members provided with a screw-threaded terminal stem portion 39 received within a screw-threaded socket in the adjacent end of the other link member. With the latch 27 and the lever 33 in a substantially upright position, as shown at the right hand side of Figure 3, the seat back may be placed in its upright position, after which the lever may be forced downwardly so as to swing the latch upwardly into engagement with the cross bar or keeper 32, whereby the seat back will be forced downwardly upon the dowel pins 23, and the side of the automobile body drawn inwardly into snug engagement with the end of the seat back, thereby, rigidly holding the seat back in place and also effectually tying together the opposite sides of the automobile body. The latch is released merely by prying up the free end of the lever 33 and moving the same upwardly into a substantially upright position, the toggle connection between the lever and the latch imparting the necessary movements to the latch.

When the upright back of the front seat has been placed in a horizontal position for use as a bed, each of the latches 27 may be manipulated to extend through a slot 40 in the bracket 4, the underside of the latch being provided with a depending shoulder 41 designed to engage back of the adjacent portion of the bracket 4 and thereby hold the seat back and the bracket against lateral separation. It will here be pointed out that each latch 27 constitutes means for holding the seat back in its normal upright position and also in its horizontal position.

What is claimed is:

1. The combination of an automobile body, a displaceable seat back, a pivoted latch mounted within the seat back and projecting at one upright edge thereof, a lever fulcrumed upon the top edge of the seat back, a link connection between the lever and the latch, and a keeper within the automobile body and detachably engageable by the latch to hold the seat back in its upright position.

2. The combination of an automobile body, a displaceable seat back provided in each of its upper corners with a recess, a latch pivoted intermediate of its ends in each of the recesses and having a hooked terminal projecting beyond the upright edge of the seat back, a lever let into and fulcrumed upon the top edge of the seat back, a link connection between the lever and the latch, and a keeper within the automobile body and detachably engageable by the latch to hold the seat back in its upright position.

3. The combination of an automobile body, front and rear seats having seat cushions, foldable seat supports disposed between the seats, the rear seat cushion capable of being moved forwardly and supported upon the seat supports, a displaceable seat back for the front seat, said seat back capable of being moved into a horizontal position between the seat cushions to form a bed, and fastening means carried by the seat back and having detachable connection with the automobile body in the upright position of the seat back, said fastening means also having detachable connection with the supporting means for the rear seat when the seat back is in a horizontal position.

4. The combination of an automobile body, front and rear seat cushions, foldable brackets mounted between the seats and capable of supporting the rear seat cushion when moved forwardly upon the brackets, a displaceable seat back for the front seat, said seat back capable of being moved into a horizontal position between the front and rear seat cushions to form a bed and with its rear portion between the brackets, and fastening means carried by opposite edges of the seat back and having detachable connections with the automobile body in the upright position of the seat back, said fastening means also having detachable connection with the respective brackets when the seat back is in a horizontal position.

5. The combination of an automobile body, a removable seat back capable of being moved into a horizontal position to form a bed, a cross bar beneath and supporting the seat back and divided into upper and lower longitudinal sections hinged together, the upper section capable of being swung downwardly to accommodate the seat back in its horizontal position.

6. The combination of an automobile body, a removable seat back capable of being moved into a horizontal position to form a bed, a cross bar beneath and supporting the seat back and divided into upper and lower longitudinal sections hinged together, the upper section capable of being swung downwardly to accommodate the seat back in its horizontal position, there being a detachable pin and socket connection between the seat back and the upper cross bar section.

7. The combination of an automobile body, a front seat, a removable front seat back capable of being moved to a horizontal position to form a bed in conjunction with the seat, a cross bar for the support of the rear portion of the seat, another cross bar for the support of the seat back, each cross bar being divided into top and bottom sections hinged together, each top section capable of being swung downwardly to accommodate the seat back in its horizontal position.

8. The combination of an automobile body, front and rear seats and seat cushions therefor, foldable brackets disposed between the seats and capable of supporting the rear seat cushion when moved forwardly upon the brackets, a removable front seat back of greater thickness than the seat cushions and capable of being moved into a horizontal position between and on a level with the seat cushions to form a bed, a cross bar for the support of the seat back and divided into upper and lower longitudinal sections hinged together, the upper section capable of being folded downwardly to permit the seat back to be placed in alignment with the seat cushions, and fastening means carried by the seat back and having detachable connection with the automobile body to hold the seat back in its normal upright position, said fastening means also having detachable connection with the brackets when the seat back is in its horizontal position.

9. The combination of an automobile body, a front seat cushion, front, intermediate and rear cross bar supports for the seat cushion, said seat cushion capable of being moved forwardly to bring its rear end portion upon the intermediate cross bar, another cross bar for the support of the seat back, the two rear cross bars being divided into upper and lower longitudinal sections hinged to the lower sections and capable of being folded downwardly, the seat back being thicker than the seat cushion and capable of being moved into a horizontal position in alignment with the seat cushion and supported on the lower sections of the divided cross bars.

10. The combination of an automobile body, a seat cushion, a removable seat back of greater thickness than the seat cushion and capable of being moved into a horizontal position in alignment and on a level with the seat cushion, means for supporting the seat cushion including front, intermediate and rear cross bars, a cross bar beneath and supporting the seat back, the latter cross bar and the said rear cross bar being divided longitudinally into upper and lower sections, the upper cross bar sections capable of being folded downwardly to accommodate the seat back in its horizontal position, said seat back being supported upon the lower cross bar sections in its horizontal position with its front end abutting the rear side of the intermediate support for the seat cushion.

JAMES NEIL MACDONALD.
ROBIN ROY MACDONALD.